United States Patent
Zarate Sanchez et al.

(10) Patent No.: US 6,622,444 B2
(45) Date of Patent: Sep. 23, 2003

(54) SYNTHETIC CORE CONSTRUCTION PANEL AND APPARATUS FOR MAKING SAME

(76) Inventors: Gabriel Humberto Zarate Sanchez, Calle 92, 933 Bogota (CO); Felix Gomez Sanchez, Calle 92, 933 Bogota (CO)

( * ) Notice: Subject to any disclaimer, the term of this patent is extended or adjusted under 35 U.S.C. 154(b) by 40 days.

(21) Appl. No.: 09/729,552

(22) Filed: Dec. 4, 2000

(65) Prior Publication Data

US 2002/0066257 A1 Jun. 6, 2002

(51) Int. Cl.[7] .............................................. E04C 1/41
(52) U.S. Cl. .................. 52/309.11; 52/309.4; 52/309.7; 52/309.12; 52/383; 52/650.2; 52/405.3; 52/790.1; 52/794.1; 29/432; 29/446; 29/460
(58) Field of Search .................. 52/309.1, 309.11, 52/309.12, 650.2, 383, 309.9, 309.8, 309.7, 309.4, 453.3, 745.19, 703.1, 794.1, 790.1; 29/446, 432, 460

(56) References Cited

U.S. PATENT DOCUMENTS

| | | | | |
|---|---|---|---|---|
| 3,305,991 A | * | 2/1967 | Weismann | |
| 3,879,908 A | * | 4/1975 | Weismann | 52/309 |
| 4,079,560 A | * | 3/1978 | Weismann | 52/309.7 |
| 4,104,842 A | * | 8/1978 | Rockstead et al. | 52/650 |
| 4,226,067 A | * | 10/1980 | Artzer | 52/309.12 |
| 4,297,820 A | * | 11/1981 | Artzer | 52/309.11 |
| 4,336,676 A | * | 6/1982 | Artzer | 52/309.7 |
| 4,505,019 A | * | 3/1985 | Deinzer | 29/432 |
| 4,541,164 A | * | 9/1985 | Monzon Indave | 29/430 |
| 5,487,248 A | * | 1/1996 | Artzer | 52/309.12 |
| 6,185,890 B1 | * | 2/2001 | Ritter | 52/309.11 |
| 6,202,375 B1 | * | 3/2001 | Kleinschmidt | 52/309.11 |
| 6,226,942 B1 | * | 5/2001 | Bonin | 52/309.12 |
| 6,272,805 B1 | * | 8/2001 | Ritter et al. | 52/309.11 |

* cited by examiner

Primary Examiner—Carl D. Friedman
Assistant Examiner—Yvonne M. Horton
(74) Attorney, Agent, or Firm—Manuel R. Valcarcel, Esq.

(57) ABSTRACT

The present invention is a synthetic-core construction panel having a polyurethane core encased by a metal grid. The grid system comprises a first series of metal bars disposed in parallel to each other, equally spaced apart around the circumference of the core; a second series of metal bars, disposed in parallel to each other and perpendicularly to the first series of metal bars, equally spaced apart, are also disposed around the circumference of the core; and a plurality of diagonal cross-member reinforcements welded at their edges to each connecting point between the first series of metal bars and the second series of metal bars. The metal grid serves as a surface accepting masonry/plaster as a finish for the panel after installation. An apparatus for making the synthetic core construction panels is also described and claimed.

7 Claims, 8 Drawing Sheets

SYNTHETIC CORE CONSTRUCTION PANEL AND APPARATUS FOR MAKING SAME

BACKGROUND OF THE INVENTION

1. Field of the Invention

The present invention relates to construction materials. The present invention is directed toward building components used for building construction and, more particularly, toward a premanufactured, composite building panel or other composite building components that exhibit improved strength, weight, and size characteristics. More particularly, the present invention relates to a synthetic core construction panel and apparatus for making same.

2. Description of Related Art

Recent changes in today's housing industry have led to an increased use by builders of premanufactured or fabricated construction components. Premanufactured building components, such as panels, are used for walls, roofs, floors, doors, and other components of a building. Premanufactured building components are desirable because they decrease greatly the time and expense involved in constructing new building structures. However, the premanufactured building components must comply with a number of required specifications based on structural criteria, such as axial load-bearing, shear and racking strengths, and total weight of the components. Additional criteria that may affect the specifications of the components include fire resistance, thermal efficiency, acoustical rating, rot and insect resistance, water resistance and hurricane and earthquake resistance. In addition, the preferred premanufactured components are readily transportable, efficiently packaged, and easily handled.

Premanufactured components for building construction have in the past had a variety of constructions. A common component is a laminated or composite panel. One such composite panel includes a core material of foam or other insulating material positioned between wood members, and the combination is fixed together by nails, screws, or adhesives. These wood composite panels suffer from the disadvantage of being combustible and not mechanically stable enough for some construction applications. These wood composite panels are inadequate sound barriers and are subject to rot, decay, and insect attack. Accordingly, wood composite panels are not deemed satisfactory in many modern building applications. In a variation of the wood-composite building panel, a laminated skin is fixed to the outside wood members. These panels with the laminated skin are more expensive to manufacture while suffering from the same inadequacies of the panels without the laminated skin.

More recent prior art efforts have included panels constructed of polystyrene core surrounded by a welded wire mesh. The metal framework of such panels is a three-dimensional wire grille or grating, normally having the form of two parallel meshes joined together by a series of wires welded to them and which hereafter we will call connectors. The lightweight core is a layer of polystyrene, foam resin or dense box material, fiber or plastic, with reinforcing walls and indispensably nonresistant to a segment of wire passing through it. These panels are building elements fitted into the construction as walls or flooring, and are then coated with resistant mortar on both sides; the panels can easily be joined to one another on the building site by conventional means. Known panels of this type are made with very fine wire (2 mm gauge, and mesh opening of 50 mm) and are manufactured according to the following process:

(1) The vertical meshes of the panel are preconstructed in ladderlike form, that is, with two parallel wires between which short cross-members are welded.

(2) These elements are inserted in welding machines in vertical position, and crosswires are welded to them to form the complete spatial structure.

(3) These structures are slightly sunk or imbedded in a sand bed which is made to advance upon a conveyor belt, and a foam resin is sprayed on them to form the lightweight core.

The panels of this type still lack the reinforcement needed for extreme weather conditions. Because the mesh panels are only connected with a series of single spaced thin cross-members, the panel is subject to shearing, with the panels moving in parallel in different directions in response to shearing forces. The prior art panels do not have reinforcing cross-members at all edges, but rather the cross-members are spaced across the mesh faces, including through the core. Apparently, to provide reinforcing cross-members at all edges would require too much "finishing" and would increase the amount of time necessary to construct the panels. The apparati used to make the panels and the methods involved are labor-intensive, cumbersome and slow. There is a need not only for improvements in such panel designs to address hurricane and earthquake resistance needs, but also for a more efficient way of making such panels. This problem is addressed by the present invention through a novel metal grid system resembling a series of interconnected trusses.

SUMMARY OF THE INVENTION

The present invention is a synthetic core construction panel and an apparatus for making same. The panels are used as construction materials such as prefabricated wall sections.

The panels themselves in a preferred embodiment have a core made of synthetic material, preferably polyurethane or known substitute materials encased by a metal grid. In a preferred embodiment, the grid system comprises a first series of metal bars disposed parallel to each other, generally equally spaced apart on one face of the panel, said series of metal bars connected to a parallel series of metal bars disposed on the opposite face of the panel by metal bar perpendicular cross-members welded or soldered to the ends of the two series of metal bars to form a generally rectangular grid.

A second series of metal bars, also disposed in parallel to each other, also generally equally spaced apart on one face of the panel, connects to a parallel series of metal bars disposed on the opposite face of the panel by metal bar perpendicular cross-members welded or soldered to the ends of the two series of metal bars. The first series of bars is disposed under the second series of bars or vice versa, such that the two series make contact with the contact points being welded for additional reinforcement.

The metal grid system in a preferred embodiment further comprises a plurality of diagonal cross-member reinforcements welded or soldered at their edges to each connecting point between the first and second series of bars. A space or gap is maintained between the core and the grid and the cross-member reinforcements are partially embedded in the core material. The metal grid serves as a surface accepting masonry/plaster as a finish for the panel after installation. The polyurethane core is fire resistant. The diagonally disposed metal bars keep the polyurethane core centered in place in the panel. The panels are lightweight and extremely strong. The grid system absorbs forces giving the panels utility as earthquake-resistant construction materials. The core can be made of polyurethane or other synthetic materials. The metal used for the grid system can vary.

In a preferred embodiment, construction "re-bar" is utilized, and the bars are formed into generally rectangular rings by bending, thereby resulting in a grid system with fewer weld or solder points. Various gauges of "re-bar" can be used. The corners of the generally rectangular rings that are formed are created by bending the "re-bar" where desired and then welding or soldering the ends together. In this manner, the grid is created by a series of such generally rectangular rings parallel to each other and generally evenly spaced apart, with a second series of generally rectangular rings disposed parallel to each other and generally evenly spaced apart, with the first such series disposed perpendicularly to such second series, with one of the series disposed within the space surrounded by the other series. Where the rings of the two series make contact, the points can be welded or soldered for additional reinforcement. The metal diagonal cross-members are then welded or soldered at various points along the grid formed by the two series of generally rectangular bars. When the liquid form synthetic core is poured into the mold of the apparatus described below, the diagonal cross-members become embedded in the core material, and when the core material dries, the cross-members embedded therein provide additional reinforcement to the panel.

The apparatus of the present invention is a customized hydraulic press injection mold machine. It has a plurality of vertical columns connected to horizontal bars by brackets forming a rectangular box-shaped frame.

Supported within the frame, the machine has two plates that are parallel to each other. In operation the two plates are pressed together—the surfaces of each plate that face each other are configured so as to leave a cavity or mold between the two plates into which the polyurethane panel core material can be injected in liquid form. The material takes the form of the mold and hardens over time to become a panel sheet embedded in and reinforced by the metal grid. A gap is maintained between the core and the grid sheets in order to provide a surface that accepts a masonry/plaster finish after the panel has been installed on a building structure.

One of the plates is fixed, being mounted to one side of the apparatus frame. The other plate is moveable, and slides using bushings on upper and lower tracks affixed to the frame. The moveable plate is aligned with the fixed plate so that their inner faces will form a mold when the moveable plate is moved toward the fixed plate.

The moveable plate is connected on the side facing away from the fixed plate to one or more hydraulic cylinder systems, which when actuated press the moveable plate against the fixed plate.

The machine also has a plurality of pneumatic jets that shoot air at high pressure through the plates of the machine after panel material has been injected and has hardened in order to loosen the panel from the mold. The machine also utilizes clamps to hold the plates together as the panel material is injected into the mold cavity and while the material hardens.

As a result, the panels of the present invention can be constructed to vary the load-bearing strength vs. weight characteristics of the building components by varying the thicknesses, densities and configurations of the side panels and the joining sides, and by varying the number and positioning of the shear resistance connectors. Accordingly, a person can design a building structure, determine the structural requirements for the building components, and then select a desired load-bearing strength, shear strength, and weight of the building panels to meet the structural requirements, and then construct the appropriate specified panel required for the defined application.

The improved building components can be very strong, lightweight, and versatile building components. However, the manufacturing of such building components can be a relatively time-consuming and labor-intensive process, which can increase cost and lower availability of the components.

DESCRIPTION OF A PREFERRED EMBODIMENT

The present invention is a polyurethane core construction panel and apparatus for making same. The panels are used as construction materials such as prefabricated wall sections.

A. Polyurethane Core Panels

Figure 1:
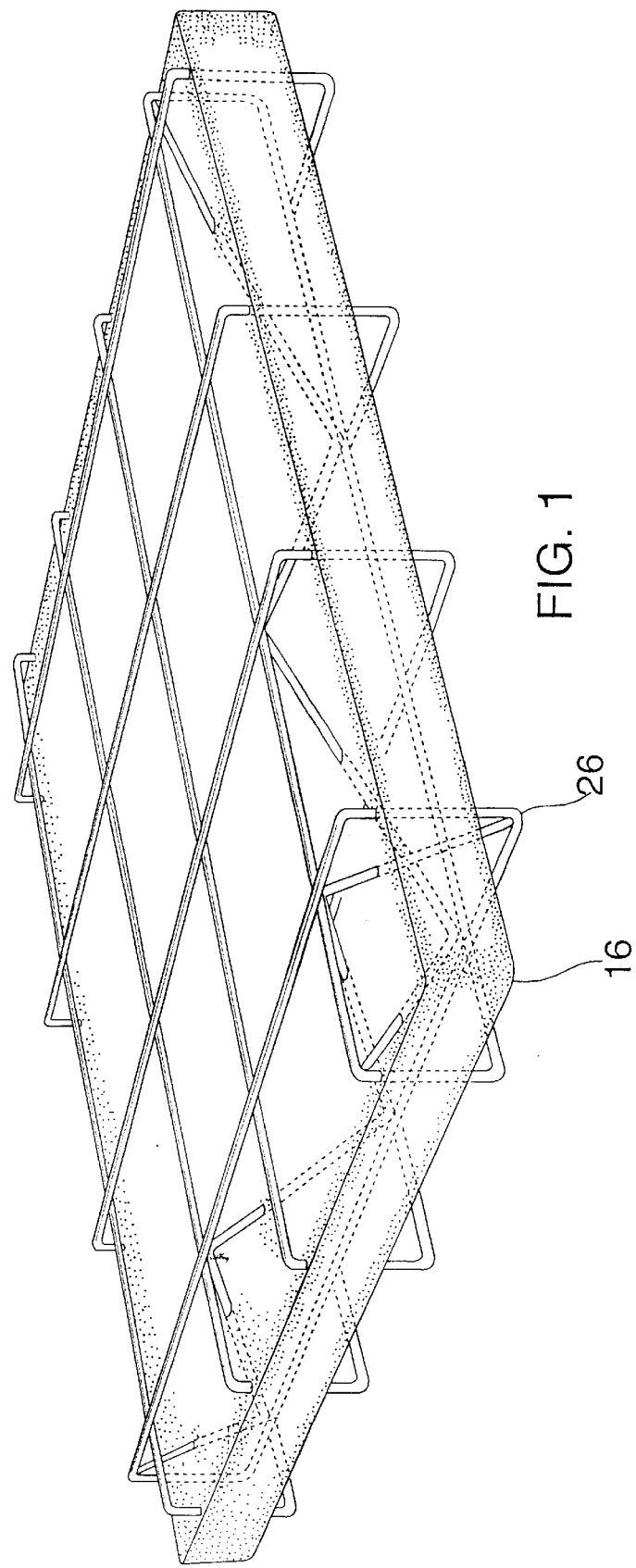
FIG. 1 is a perspective view of the panel according to the invention in a preferred embodiment, noting the elements comprising the panel.
Figure 2:
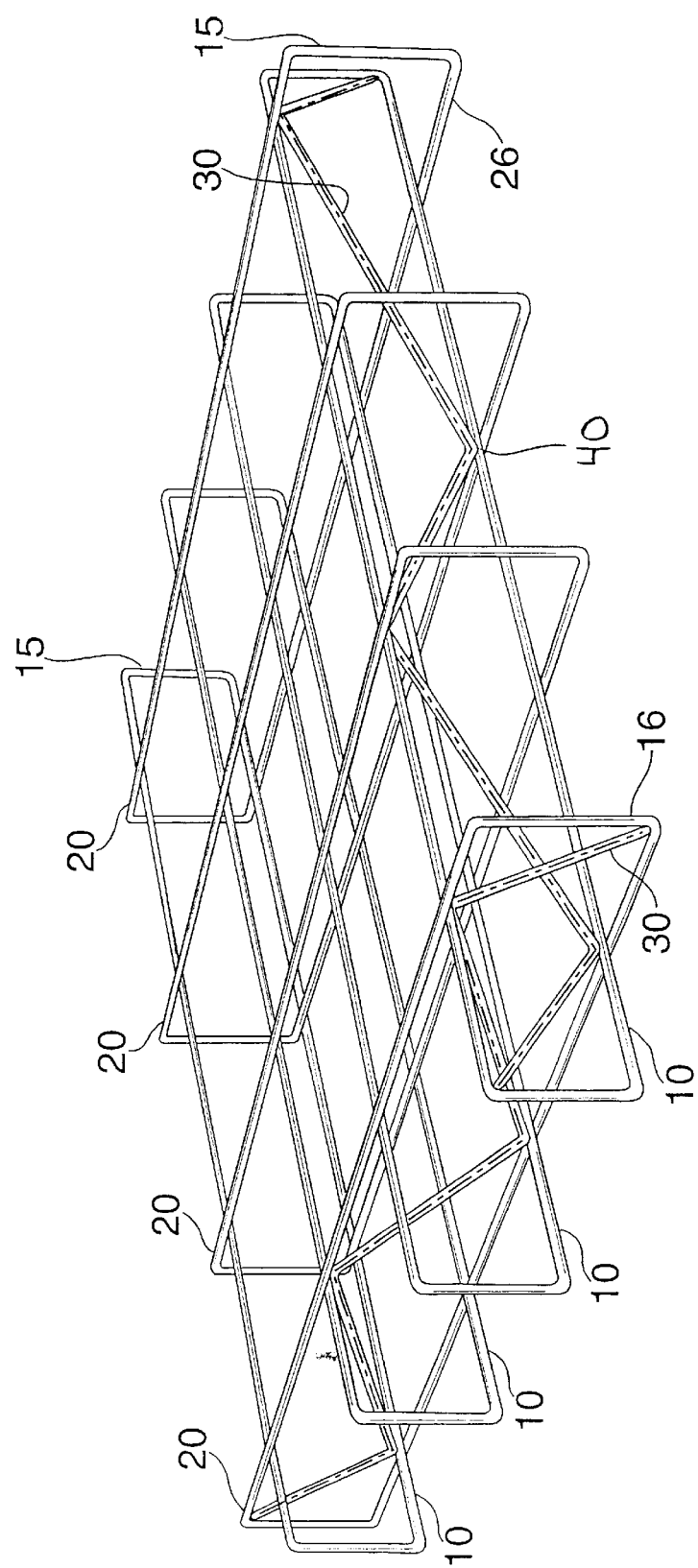
FIG. 2 is a perspective view of the metal grid system of the panel of the present invention in a preferred embodiment.

Referring now to FIG. 1, the panels themselves have a polyurethane core 16 encased by a metal grid system 26. Referring to FIG. 2, the grid system 26 comprises a first series of metal bars 10 disposed parallel to each other 26, generally equally spaced apart on one side of the panel, said series of metal bars 10 connected to a parallel series of metal bars disposed on the opposite face of the panel by perpendicular cross-members 15 welded or soldered to the ends of the two series of metal bars to form a generally rectangular grid.

A second series of metal bars 20, also disposed parallel to each other, and generally equally spaced apart on one face of the panel, connects to a parallel series of metal bars 20 disposed on the opposite face of the panel by metal bar perpendicular cross-members 15 welded or soldered to the two series of metal bars 20. The first series of metal bars 20 are disposed under the second series of metal bars 10, or vice versa such that the two series make contact, with the contact points being welded for additional reinforcement.

The grid system 26 further comprises a plurality of diagonal cross-member reinforcements 30 welded or soldered at their edges to each connecting point 40 between the first and second series of bars. The cross-member reinforcements are partially embedded in the core material.

A space or gap is preferably maintained between the core and the grid. The steel grid thereby serves as a surface accepting masonry/plaster as a finish for the panel after installation. The polyurethane core is fire resistant. The diagonally disposed, steel bars keep the polyurethane core centered in place in the panel. The panels are lightweight and extremely strong. The grid system absorbs forces giving the panels utility as earthquake-resistant construction materials.

In a preferred embodiment, construction "re-bar" is utilized, and the bars are formed into generally rectangular rings by bending, thereby resulting in a grid system with fewer weld or solder points. Various gauges of "re-bar" can be used. The corners of the generally rectangular rings that are formed are created by bending the "re-bar" where desired and then welding or soldering the ends together. In this manner, the grid is created by a series of such generally rectangular rings parallel to each other and generally evenly spaced apart, with a second series of generally rectangular rings disposed parallel to each other and generally evenly spaced apart, with the first such series disposed perpendicularly to such second series, with one of the series disposed within the space surrounded by the other series. Where the rings of the two series make contact, the points can be welded or soldered for additional reinforcement. The metal diagonal cross-members are then welded or soldered at various points along the grid formed by the two series of generally rectangular bars. When the liquid form synthetic core is poured into the mold of the apparatus described below, the diagonal cross-members become embedded in the core material, and when the core material dries, the cross-members embedded therein provide additional reinforcement to the panel.

Figure 3:
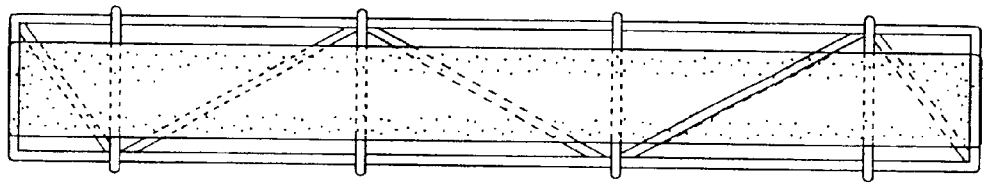
FIG. 3 is an edge view of the panel.
Figure 4:
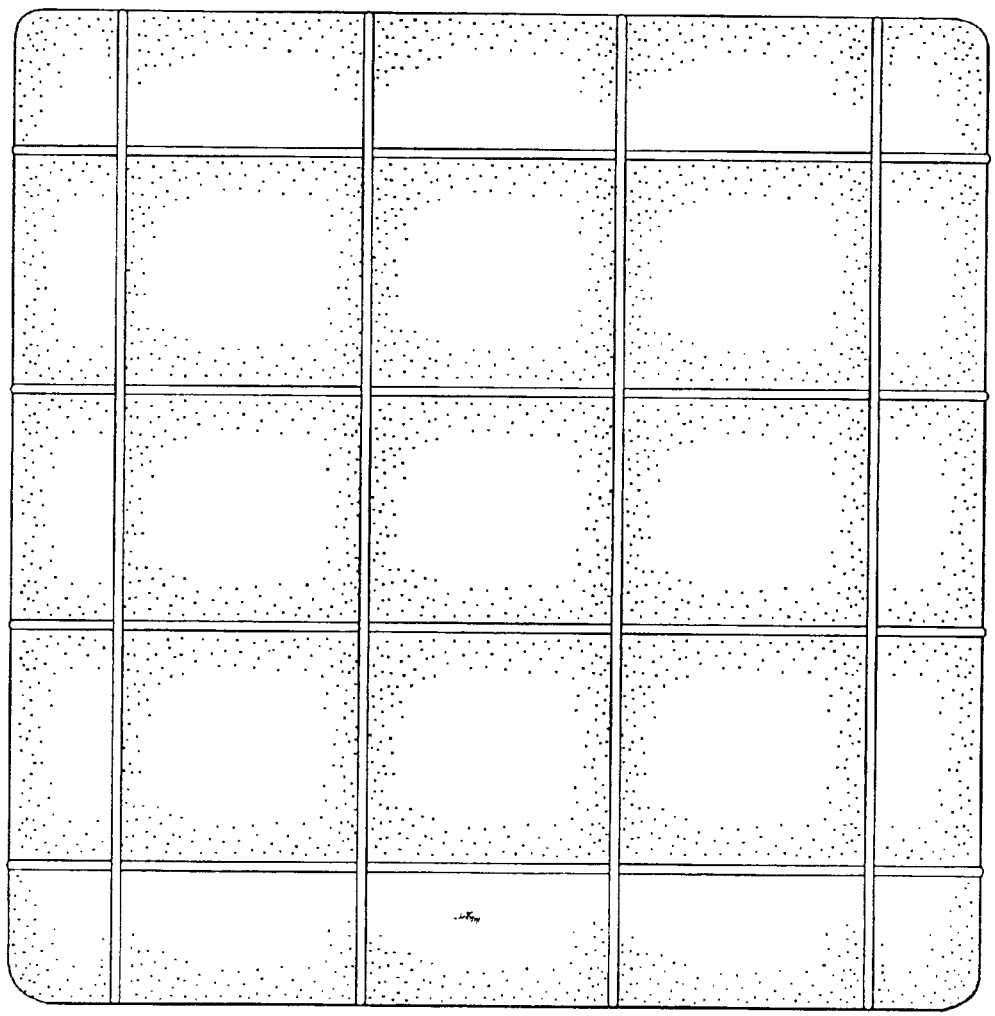
FIG. 4 is a top view of the panel.

FIG. 3 shows how the core is disposed within the metal grid system, leaving a space for application of masonry. FIG. 4 shows a sample panel.

B. Apparatus for Making Polyurethane Core Panels

Figure 5:
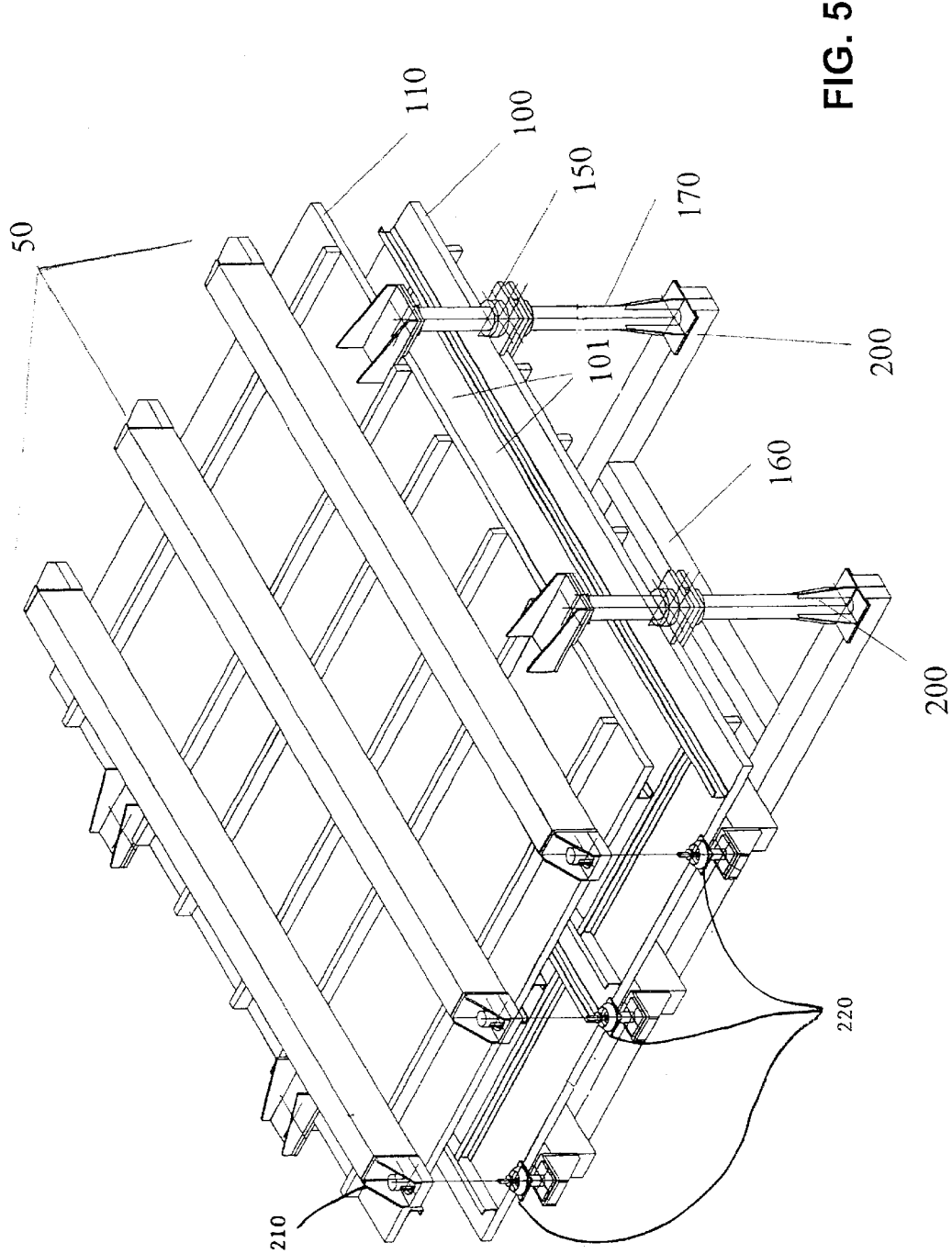
FIG. 5 is a perspective view of the apparatus for making panels in a preferred embodiment.

The apparatus is essentially a customized hydraulic press injection mold machine. Referring now to FIG. 5, it has a plurality of metal columns that form a rectangular box-shaped frame 160, within which two plates 100 and 110 and a hydraulic jack/track system 200 are installed, as further described below.

Figure 8:
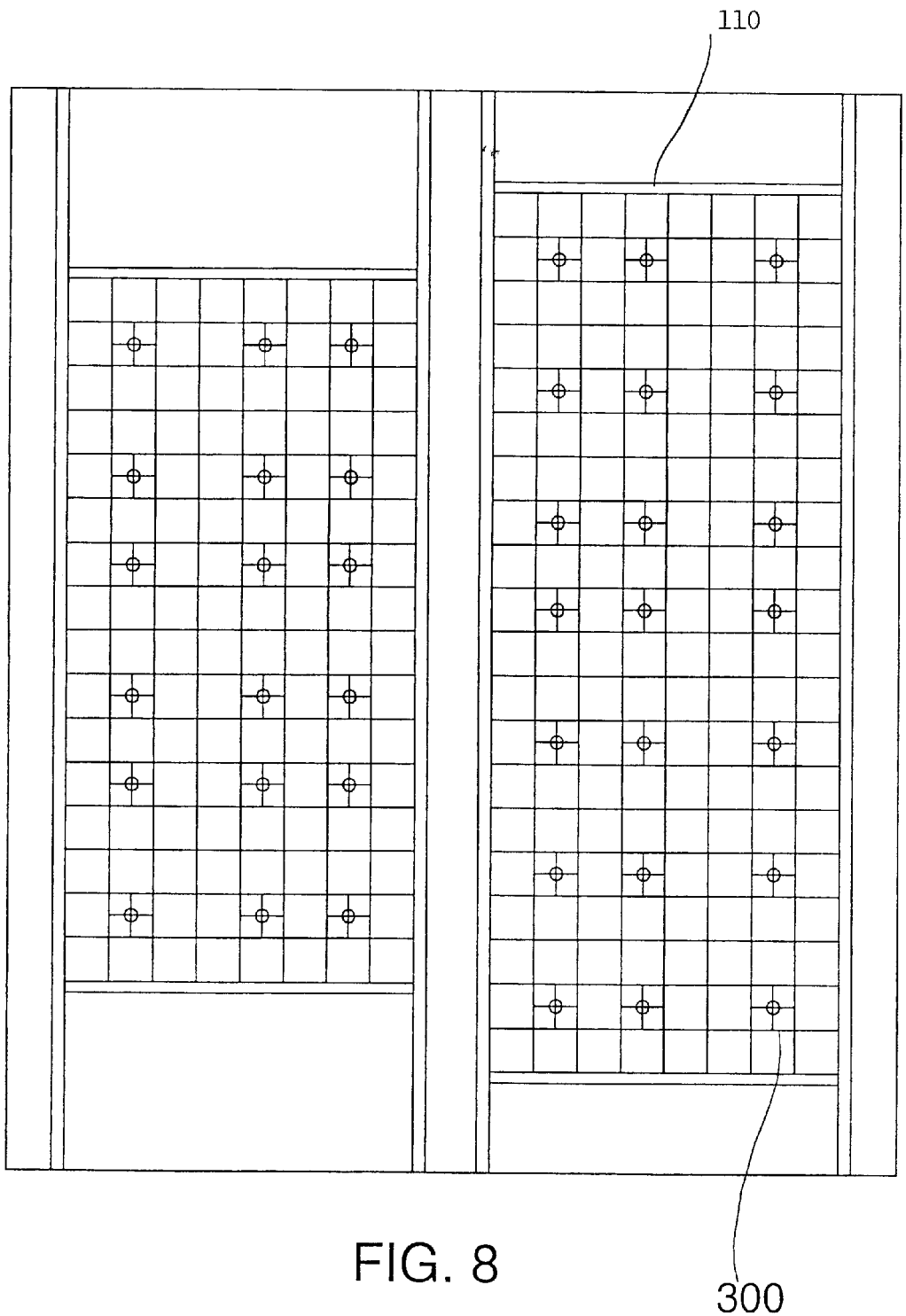
FIG. 8 is a front view of the plates of the apparatus for making panels in a preferred embodiment.

Supported and mounted within the frame 160, the apparatus has two plates 100 and 110 disposed parallel to each other. In operation, the two plates are pressed together. The surfaces of each plate that face each other 101 are configured so as to leave a cavity between the two plates into which the polyurethane panel core material can be injected in liquid form. The material takes the form of the mold and hardens over time to become a panel sheet embedded in and reinforced by the metal grid. A gap is maintained between the core and the grid faces in order to provide a surface that accepts a masonry/plaster finish after the panel has been installed on a building structure. In a preferred embodiment, a space of approximately six millimeters is maintained between the two plates when moved together so as to allow room for creation of the panel by filling the area with polyurethane encased in the metal grid. As shown in FIG. 8, in a preferred embodiment, the plates have face tiles 120 that form the desired mold for polyurethane injection.

One of the plates 110 is fixed, being mounted to one side of the frame 160. The other plate 100 is moveable, and slides horizontally guided by a one or more bushings 150 on track 170 of the hydraulic jack/track system affixed to the frame 160 and disposed perpendicularly to the two plates 110 and 110. The moveable plate 100 is aligned with the fixed plate 110 so that their inner faces 101 will form a mold when the moveable plate is moved against the fixed plate. The bushings are mounted by fastening or other means at or near the outer edge of the moveable plate.

Figure 6:
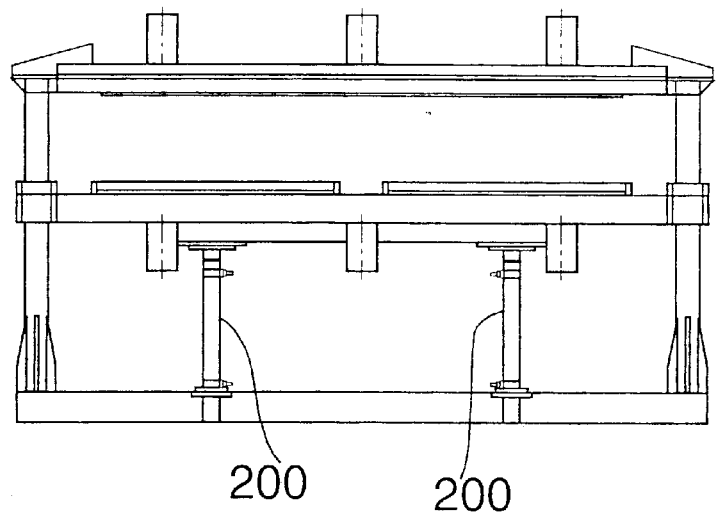
FIG. 6 is a side view of the apparatus for making panels.

The moveable plate 100 is connected on the side facing away from the fixed plate 110 to one or more hydraulic jack/track systems 200 having hydraulic cylinders, which when actuated press the moveable plate 100 against the fixed plate 110. FIG. 6 shows the apparatus hydraulic cylinders of the jack/track system 200 in a preferred embodiment. The jack/track system 200 is actuated by an electric power source. The jack/track system 200 moves the moveable plate 100 along the jack/track system 200 toward the fixed plate 110 until the desired space is left between the two plates 100 and 110. Once the moveable plate 100 has been moved to the desired position it is kept in place by a plurality of brackets 210 located along the frame sides, which act as supports against the pressure of the expanding polyurethane that is injected into the mold. After the polyurethane has hardened the brackets 210 are moved away and the moveable plate 100 can be moved away to separate the panel from the apparatus.

Figure 7:
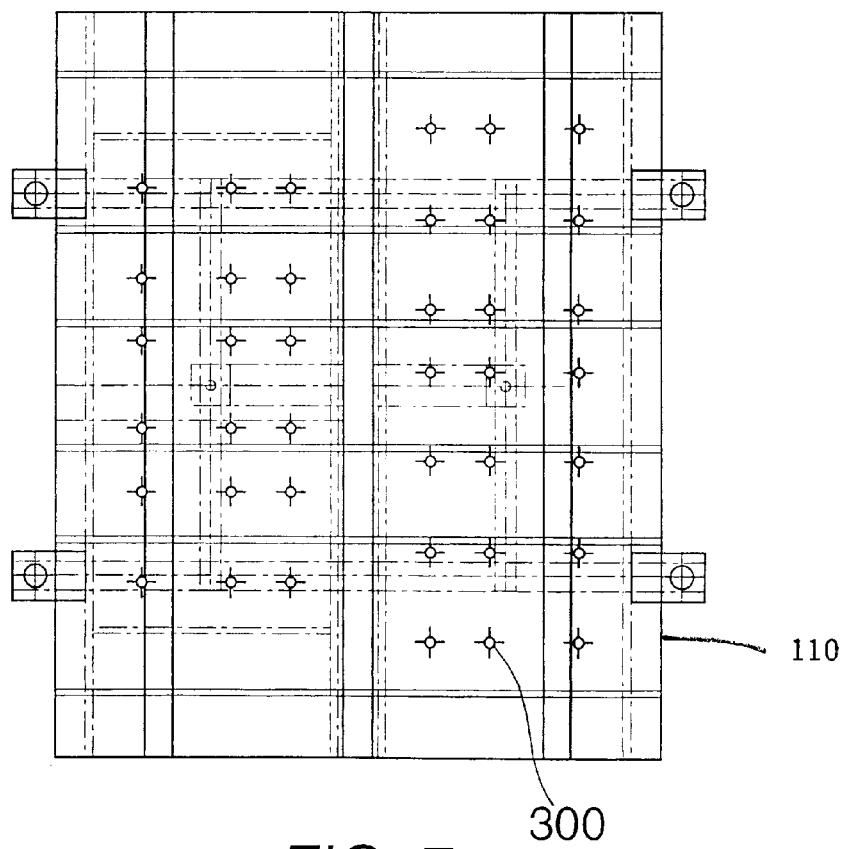
FIG. 7 is a top view of the apparatus for making panels.
Figure 9:
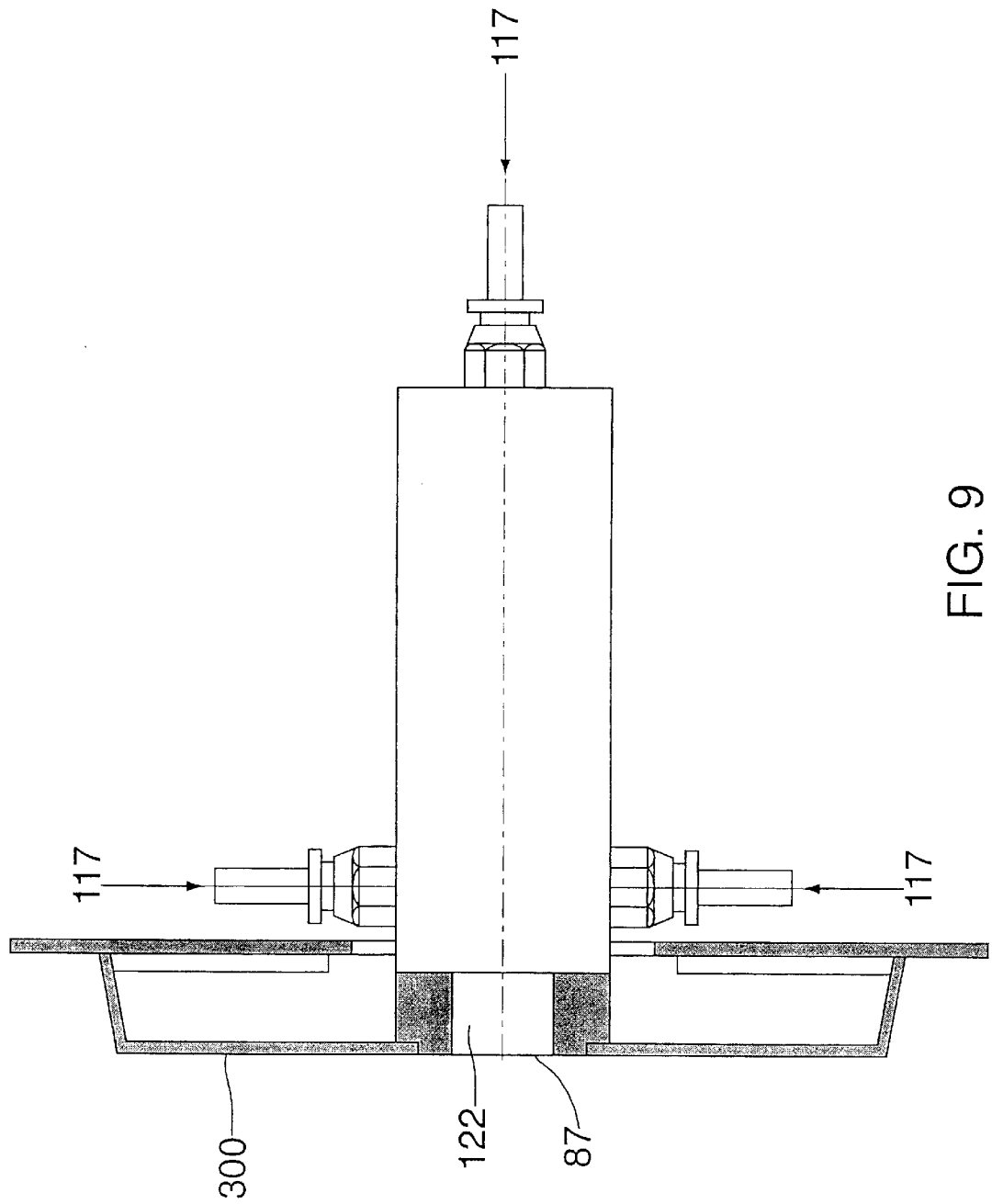
FIG. 9 is a front view of the pneumatic jet system of the apparatus for making panels in a preferred embodiment.

The apparatus also has a plurality of pneumatic jets 300 that shoot air at high pressure through the plates 100 and 110 of the apparatus after panel core material has been injected and has hardened in order to loosen the panel from the apparatus. FIGS. 7 and 8 show a preferred configuration for placement of pneumatic jets through the plates. The jets can also be provided on one plate rather than both. When the core has hardened, the panel is loosened from the mold by the pneumatic jet system. FIG. 9 shows a preferred embodiment of the pneumatic jet utilized in the apparatus in a preferred embodiment. A plurality of cylindrical jets 300 are disposed through the faces of the apparatus. The jets have nozzles 117 on the ends facing out of the mold where hoses providing high pressure air are connected and at least one nozzle where a hose is connected to evacuate the system prior to panel creation. The end of each cylindrical jet that faces the mold cavity where the panel is formed has a hollow cylinder 87 with a piston-like driver 122 disposed therein. The driver 122 is moveable laterally through the cylinder 87. When air is forced through the supply hoses and into the jets 300, the air forces the driver 122 in the direction of the panel, creating a force that separates the panel from the mold. When the mold is forming the driver 122 is disposed generally flush with the mold surface.

Figure 10:
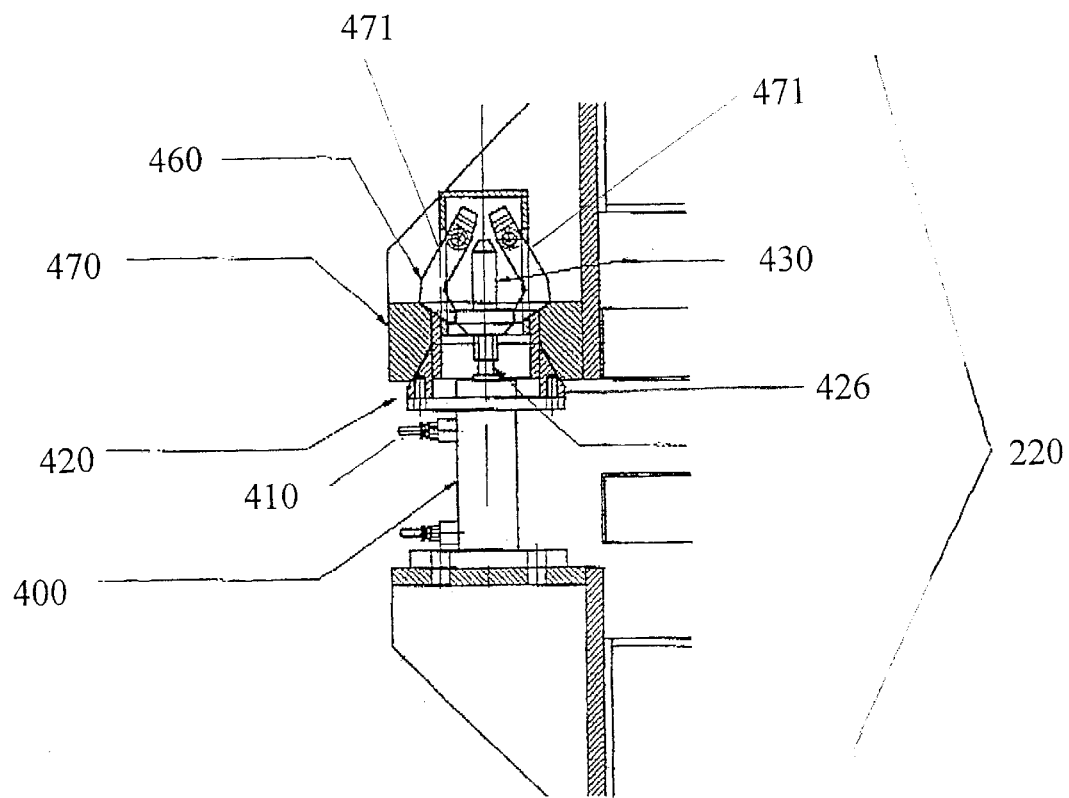
FIG. 10 is a front view of the plate fastening brackets of the apparatus for making panels in a preferred embodiment.

The apparatus in a preferred embodiment also utilizes pneumatic fasteners 220 to hold the plates 100 and 110 together as the panel material is injected into the: apparatus mold cavity and while the panel core material hardens. FIG. 10 shows the fastener system design in a preferred embodiment.

The pneumatic fastening system in a preferred embodiment comprises a plurality of pneumatic cylinders 400 (e.g. 6) having nozzles 410 for connection of hoses supplying high pressure air and a cylindrical coupling 420 at the end facing the fixed plate having within it a centered post guide 430, a tapered base 426 disposed within the cylindrical coupling, and one or more or more generally "L" shaped clamping arms 460 are pivotally mounted near their upper end opposite to each other. The "L" shaped clamping arms have curved ends 460 that rest on the outer surface of tapered base 426. The pneumatic cylinders are preferably mounted on the outer edges of the moveable plate. The fixed plate has an equal number of conical receptors 470 aligned with the pneumatic cylinders to receive the cylindrical coupling 420 of the pneumatic cylinders when the moveable plate is moved toward the fixed plate.

In operation, when the moveable plate is moved toward the fixed plate to close the mold, air is supplied to drive the cylindrical coupling 420 of the pneumatic cylinder toward the aligned conical receptor 470.

The curved ends of the clamping arms 460 rest on the wider tapered surface of the tapered base 426. As a result, part of the outer edges of the clamping arms 460 protrude through slots 471 provided through the cylindrical coupling 420 and engage a corresponding mating channel provided in the inner surface of the aligned conical receptor 470, thereby fastening the fixed plate to the moveable plate in the closed position.

To open the mold, the guide post 430 is moved further toward the conical receptor 470 by application of pneumatic force from high pressure air supplied through the hoses. As the clamping arms 460 follow the narrowing taper of the tapered base 426, their outer edges 460 move inward within the cylindrical coupling 420.

C. Operation of Apparatus

In a preferred embodiment, the apparatus is used as follows: With the moveable plate 100 in the open position away from the fixed plate 110, the metal grid is inserted within the open space created thereby, with the metal grid faces parallel to the plate faces. The hydraulic jack/track system is then actuated to move the moveable plate against the fixed plate to form the mold for injection of the polyurethane core. The metal grid fits within the pre-configured plates so that the plates can be moved together without distorting the grid structure. The hydraulic jack/track system 200 keeps the plates together as the polyurethane is poured reinforced by the fasteners 220. The polyurethane is then poured into the mold and allowed to harden. After the core has hardened the fasteners 220 are removed and the hydraulic pressure removed so that the moveable panel can be moved away from the fixed panel. The pneumatic jet system 300 is then activated to force air against the panel to loosen it from the plates. The hydraulic system is then actuated to move the moveable plate away from the fixed plate. The panel can then be removed from the apparatus.

Utilizing the described apparatus, it is possible to manufacture panels of varying crosssection or of any shape, bending the two principal meshes as desired and adapting the length of the connectors to them, giving the lightweight core a form conforming to the exterior surface of the meshes.

While the present invention has been shown and described herein in what is considered to be a preferred embodiment thereof, illustrating the results and advantages over the prior art obtained through the present invention, the invention is not limited to the specific embodiments described above. Thus, the forms of the invention shown and described herein are to be taken as illustrative and other embodiments may be selected without departing from the spirit and scope of the present invention.

What is claimed:

1. A synthetic-core construction panel comprising a hardened synthetic core and a metal grid encasing said core, said metal grid comprising a first plurality of metal bars disposed in parallel to each other around the circumference of said core, a second plurality of metal bars disposed in parallel to each other and perpendicularly to said first plurality of metal bars around the circumference of said core, and a plurality of diagonal crossbars connected at their edges to points of intersection between said first plurality of metal bars and said second plurality of metal bars and partially embedded in said synthetic core.

2. The synthetic-core construction panel of claim 1, wherein said core material is polyurethane.

3. The synthetic-core construction panel of claim 1, wherein said metal grid is made of construction re-bar.

4. The synthetic-core construction panel of claim 1, wherein a gap is maintained between said synthetic core to provide a surface for application of finishing materials.

5. An apparatus for making the synthetic core construction panel of claim 1, comprising a rigid frame, a fixed plate mounted within said rigid frame having an inner face, a moveable plate having an inner face that is aligned with and faces said inner face of said fixed plate to serve as a mold for said synthetic core when said moveable plate is moved toward said fixed plate, a hydraulic jack/track system disposed perpendicularly to said plates, mounted at one end to said rigid frame and mounted at the opposite end to said fixed plate, said hydraulic jack/track system comprising two or more tracks, one or more bushings slidably engaged to each of said tracks and mounted to said moveable plate, one or more hydraulic cylinders which when actuated cause said moveable plate to move toward said fixed plate and a plurality of pneumatic jets disposed through at least one of said fixed plate or said moveable plate for pneumatic release of panels from said plate.

6. The apparatus of claim 5, further comprising a plurality of pneumatic jets disposed through both said fixed plate and said moveable plate for pneumatic release of panels from said plates.

7. The apparatus of claim 5, further comprising one or more pneumatic fasteners mounted to secure said fixed plate to said moveable plate when said plates are moved together to form a mold, each said pneumatic fastener comprising a pneumatic cylinder mounted to said moveable plate having one or more nozzles for air supply, a cylindrical coupling mounted to said pneumatic cylinder at the end facing said fixed plate, said cylindrical coupling further comprising a centered post guide disposed in the center of said coupling, a tapered base disposed beneath said post guide within said coupling and one or more generally "L" shaped clamping arms having curved ends that are pivotally mounted at one end to said cylindrical coupling and that rest at the opposite end on the side surface of said tapered base, one or more slots disposed through the walls of said cylindrical coupling and a conical receptor mounted to said fixed plate and aligned with said pneumatic cylinder to receive said cylindrical coupling.

* * * * *